P. P. ROBERTS.
Vegetable-Washer.
No. 166,146. Patented July 27, 1875.
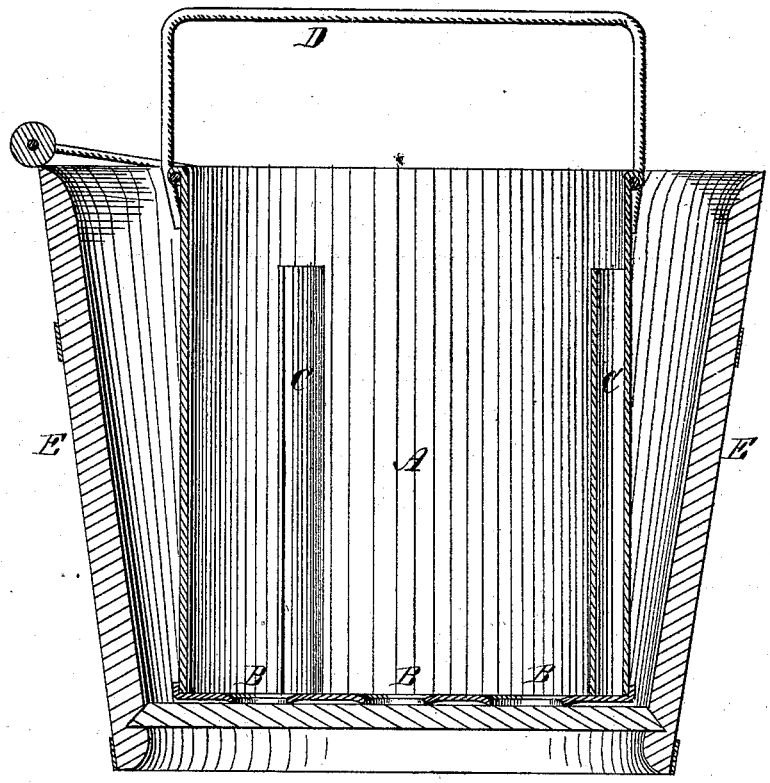

UNITED STATES PATENT OFFICE.

PERLEY P. ROBERTS, OF MORRISVILLE, VERMONT.

IMPROVEMENT IN VEGETABLE-WASHERS.

Specification forming part of Letters Patent No. 166,146, dated July 27, 1875; application filed April 1, 1875.

*To all whom it may concern:*

Be it known that I, PERLEY P. ROBERTS, of Morrisville, in the county of Lamoille and in the State of Vermont, have invented certain new and useful Improvements in Vegetable-Washers; and do hereby declare that the following is a full, clear, and exact description thereof, reference being had to the accompanying drawings and to the letters of reference marked thereon, making a part of this specification.

The nature of my invention consists in the construction of a vegetable-washer, as an improvement upon the patent granted to Porter & Roberts on the 11th of February, 1868, No. 74,420, as hereinafter set forth.

The invention consists of a cylindrical vessel, of convenient size and suitable material, adapted to be set within an ordinary bucket or pail containing water, and provided with a number of apertures through the bottom, a series of perpendicular washers or stirrers on the inner side, and a stationary bail or handle by means of which it can be rotated.

The drawing represents a vertical section of my improved apparatus.

The letter A represents a cylindrical vessel, of any convenient size, constructed of sheet metal or other suitable material. Through the bottom of the same are formed a series of any desired number of apertures, B, and along the inner sides are a series of washers or stirrers, C. These stirrers are preferably formed of semi-cylindrical pieces of sheet metal, soldered or otherwise secured to the sides of the vessel, and extending from the bottom thereof nearly to the top. D represents a stationary handle or bail attached to the top of the vessel A, in any convenient manner, by means of which the same may be rotated back and forth. E represents an ordinary pail or bucket, of such size as to conveniently hold the vessel A and allow the same to be rotated therein.

The operation of the apparatus is as follows: The vessel A, being properly filled with the vegetables, is placed in the pail or bucket E, which is then filled with water to a proper height. The water will enter the vessel A through the apertures B through the bottom, and will surround the vegetables therein. The vessel is then rotated by grasping the handle and rapidly turning it back and forth. The stirrers or washers cause the water to circulate thoroughly throughout the mass of vegetables, removing all dirt, which falls through the perforations into the pail or bucket, leaving the vegetables perfectly clean.

What I claim, and desire to secure by Letters Patent, is—

As an article of manufacture, the vessel A, with closed sides and perforated bottom B, and having vertically placed stationary and curved stirrers C, and bail D, all as set forth.

In testimony that I claim the foregoing I have hereunto set my hand this 11th day of March, 1875.

PERLEY P. ROBERTS.

Witnesses:
A. J. HORNER,
A. E. HORNER.